United States Patent
Kobata et al.

(10) Patent No.: US 7,000,489 B2
(45) Date of Patent: Feb. 21, 2006

(54) SEAT-LOAD MEASURING APPARATUS

(75) Inventors: Toshihiko Kobata, Omihachiman (JP); Tetsumei Mochizuki, Utsunomiya (JP)

(73) Assignees: Takata Corporation, Tokyo (JP); Honda Motor Co. Ltd., Tokyo (JP)

( * ) Notice: Subject to any disclaimer, the term of this patent is extended or adjusted under 35 U.S.C. 154(b) by 0 days.

(21) Appl. No.: 10/780,583

(22) Filed: Feb. 19, 2004

(65) Prior Publication Data

US 2004/0237668 A1     Dec. 2, 2004

(30) Foreign Application Priority Data

Apr. 18, 2003   (JP) .............................. 2003-113970

(51) Int. Cl.
  *G01L 1/26* (2006.01)
  *G01L 5/04* (2006.01)

(52) U.S. Cl. ................................. 73/862.391

(58) Field of Classification Search .................. 73/862, 73/637, 381, 856, 862.391; 280/806; 177/136, 177/144; 324/662; 180/273
See application file for complete search history.

(56) References Cited

U.S. PATENT DOCUMENTS

| | | | | |
|---|---|---|---|---|
| 6,069,325 A | * | 5/2000 | Aoki | 177/136 |
| 6,397,688 B1 | * | 6/2002 | Sakamoto et al. | 73/862.637 |
| 6,571,647 B1 | | 6/2003 | Aoki et al. | |
| 6,586,948 B1 | * | 7/2003 | Aoki et al. | 324/662 |
| 6,732,593 B1 | * | 5/2004 | Sakamoto et al. | 73/856 |
| 6,841,741 B1 | * | 1/2005 | Kajiyama | 177/144 |

* cited by examiner

*Primary Examiner*—Edward Lefkowitz
*Assistant Examiner*—Octavia Davis
(74) *Attorney, Agent, or Firm*—Foley & Lardner LLP

(57) ABSTRACT

A seat-load measuring apparatus includes: a base having an open top and configured to be fixed to a seat bracket configured to support a load imposed on a vehicle seat; an arm supported by the base and configured to receive the load imposed on the vehicle seat; a load sensor supported by the arm to detect the load imposed on the vehicle seat; a rail bracket configured to support a seat rail that movably guides the vehicle seat in a vehicle front-rear direction, and to connect the base to the seat rail; and a load support member connected to the rail bracket and configured to support a load imposed on the seat rail, the load being heavier than a predetermined load, where the base is connected under the seat rail with the rail bracket located between.

6 Claims, 13 Drawing Sheets

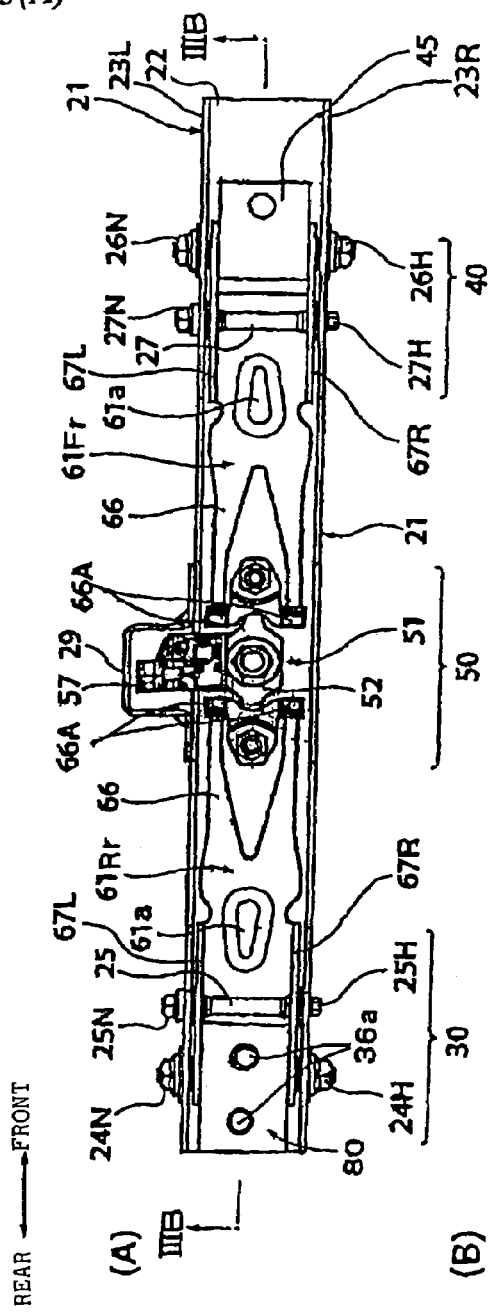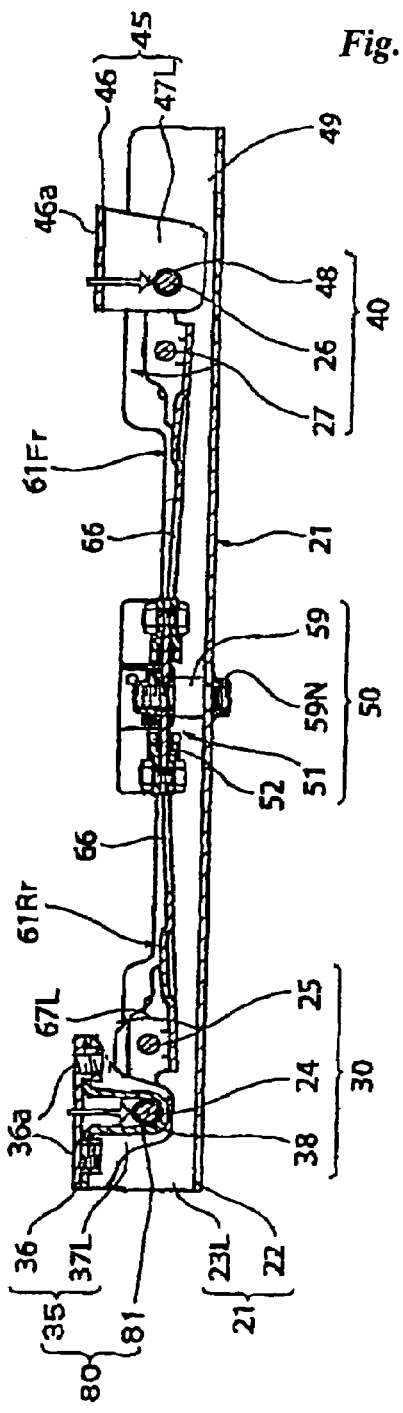
Fig. 3(A)
Fig. 3(B)

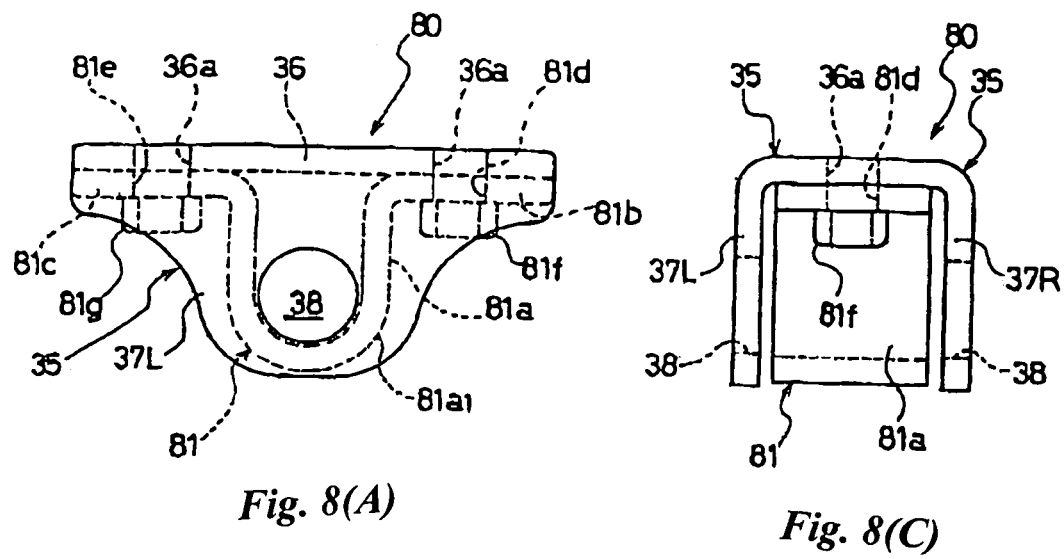
*Fig. 8(A)*
*Fig. 8(C)*
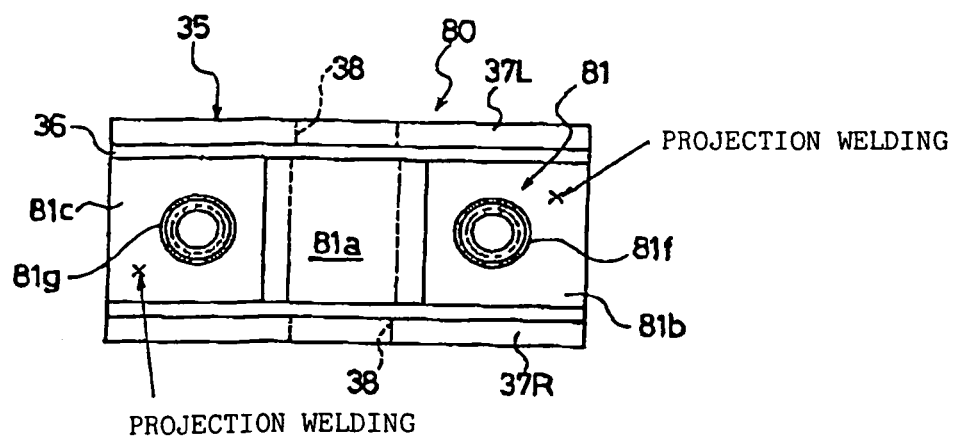
*Fig. 8(B)*

SEAT-LOAD MEASURING APPARATUS

BACKGROUND

The present invention relates to a technical field of a seat-load measuring apparatus mounted under a seat rail for guiding a seat of a vehicle, such as a car, so as to measure the load imposed on the vehicle seat. More particularly, the present invention belongs to a technical field of a seat-load measuring apparatus having a connecting bracket that connects a base thereof to a seat rail.

Seat-load measuring apparatuses 104 have been proposed which are mounted under seat rails 103 for guiding a vehicle seat 102, on which a person 101 sits, in order to measure the load imposed on the vehicle seat 102, as shown in FIGS. 14(A) to 14(C). In each seat-load measuring apparatus 104, a lower surface of a base 105 that has an upward-pointing angular-U shape in cross section is fixed to a seat mounting section 107 of a vehicle body with seat brackets 106 at the front and rear ends therebetween, and the seat rail 103 and the base 105 are connected by a pin bracket (hereinafter also referred to as a rail bracket) 108 serving as a connecting bracket that has a downward-pointing angular-U shape in cross section. In this case, the seat rail 103 is firmly connected to the flat upper surface of the pin bracket 108, and a bracket pin (hereinafter also referred to as a stopper bolt) 109 is extended through pin holes 108a and 108b provided in the right and left side plates of the pin bracket 108 and pin holes 105a and 105b provided in the right and left side plates of the base 105, thereby connecting the seat rail 103 to the base 105 (for example, see Japanese Unexamined Patent Application Publication No. 2000-258234).

In a case in which a heavy load is imposed on the pin bracket 108 that connects the seat rail 103 and the base 105 of the seat-load measuring apparatus 104, for example, in a vehicle collision, the pin bracket 108 must have a sufficient strength to support the heavy load.

However, in the connecting structure for the seat rail 103 and the base 105 of the seat-load measuring apparatus 104 disclosed in the above Japanese patent publication only the bracket pin 109 extends through the pin holes 105a and 105b simply provided in the right and left side plates of the base 105 having an upwardly-pointing angular-U shape in cross section and the pin holes 108a and 108b simply provided in the right and left side plates of the pin bracket 108 having a downwardly-pointing angular-U shape in cross section. Therefore, the strength of the pin bracket 108 is insufficient. That is, the strength of the pin bracket 108 can be increased to some extent by increasing the dimensions of portions 108c and 108d of the pin bracket 108 having the pin holes 108a and 108b (for example, the thicknesses, and the distances from the pin holes 108a and 108b to the outer peripheral edge of the pin bracket 108). However, in such a case in which the dimensions of the portions of the pin bracket 108 having the pin holes 108a and 108b are simply increased, layout restrictions are increased, and the mounting flexibility is reduced.

Although a heavy load, for example, in a vehicle collision can be, of course, supported by the connecting structure using the pin bracket 108 disclosed in the above Japanese publication, it is preferable to more reliably support such a heavy load without increasing the layout restrictions.

SUMMARY OF THE INVENTION

One object of the present invention is to provide a seat-load measuring apparatus that increases mounting flexibility without increasing layout restrictions and that can more reliably support a heavy load imposed, for example, in a vehicle collision.

According to an embodiment of the present invention, a seat-load measuring apparatus includes a base having an open top and fixed to a seat bracket to support a load imposed on a vehicle seat, an arm supported by the base to receive the load imposed on the vehicle seat, a load sensor supported by the arm to detect the load imposed on the vehicle seat, and a rail bracket means for supporting a seat rail that movably guides the vehicle seat in a vehicle front-rear direction. The seat imposed on the vehicle seat is measured by the load sensor, the base is connected under the seat rail with the rail bracket means therebetween, and the rail bracket means includes a rail bracket for connecting the seat rail and the base, and a load support member for supporting a load imposed on the seat rail, the load being heavier than a predetermined load.

In another aspect, the arm and the rail bracket are connected by a stopper pin, and the load support member is U-shaped by a belt-shaped plate to have an arc portion. When a load heavier than a predetermined load is imposed on the seat rail, the arc portion of the load support member is brought into contact with the stopper pin to support the heavy load.

In another aspect, the seat bracket is fixed to a vehicle body.

In another aspect, the load sensor is supported by the base having the open top with the arm therebetween, and the load imposed on the vehicle seat and the arm is detected by the load sensor.

When a load is imposed on the seat rail, since the load is normally relatively light, it is supported by the rail bracket. In contrast, when a relatively heavy load is imposed, for example, in a vehicle collision, it is supported by the load support member.

Since a heavy load produced, for example, in a vehicle collision is supported by the load support member in this way, the rail bracket means has a sufficient strength to withstand such a heavy load. Consequently, there is no need to increase the strength of the rail bracket. As a result, the dimensions of the rail bracket do not need to be increased.

Therefore, the rail bracket can be made compact, layout restrictions are lightened, and mounting flexibility is increased.

In particular, when a heavy load is imposed on the seat rail, it may be supported by the contact of the arc portion of the load-support member made of a belt-shaped plate with the stopper pin. Therefore, the heavy load is reliably supported with a simple structure.

In another aspect, the vehicle seat can be stably supported on the vehicle body by fixing the seat bracket to the vehicle body, and the load on the vehicle seat can be more precisely detected by the load sensor.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 3(A) is a plan view of the seat-load measuring apparatus of an embodiment in an assembled state, and FIG. 3(B) is a cross-sectional view, taken along line IIIB—IIIB in FIG. 3(A).

FIGS. 8(A), 8(B), and 8(C) are a front view, a bottom view, and a right side view, respectively, of a rear rail bracket means in an embodiment.

DETAILED DESCRIPTION

The disclosures of Japanese Unexamined Patent Application Publications Nos. 2000-258223 and 2000-258234 are incorporated by reference herein in their entireties.

An embodiment of the present invention will be described below with reference to the drawings.

Figure 1:
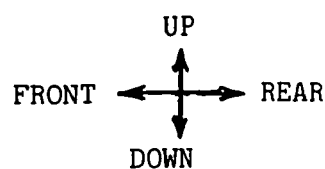
FIG. 1 is a side view of a vehicle seat to which an embodiment of a seat-load measuring apparatus according to the present invention is applied.
Figure 1:
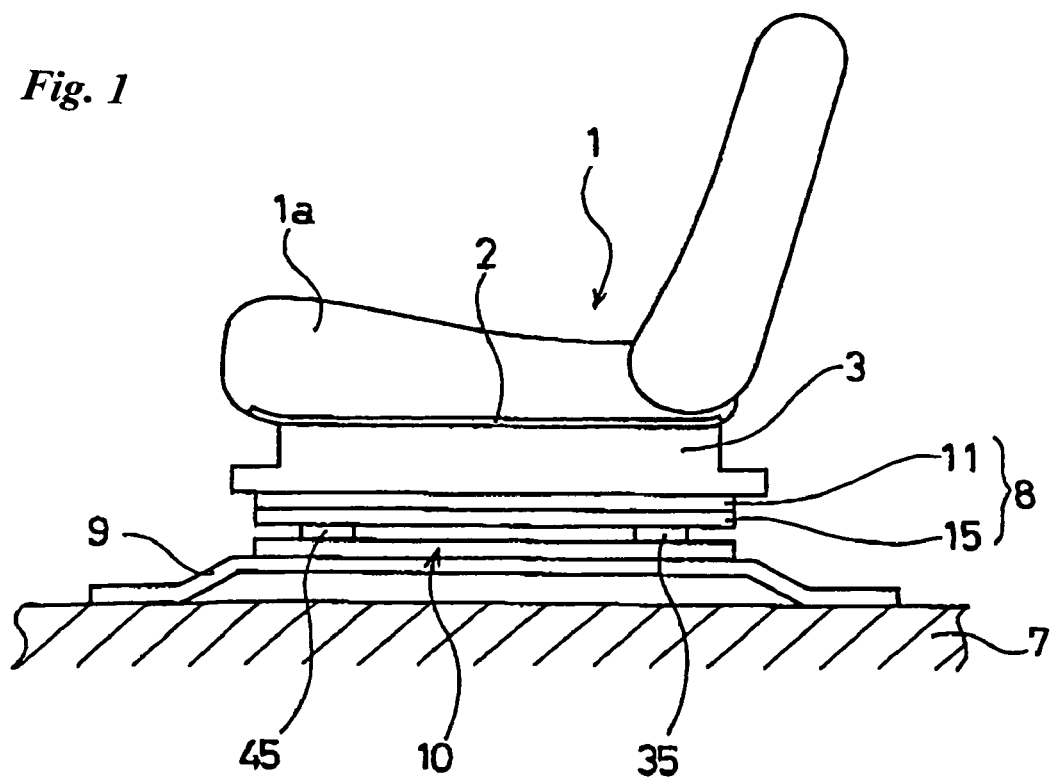
Figure 2:
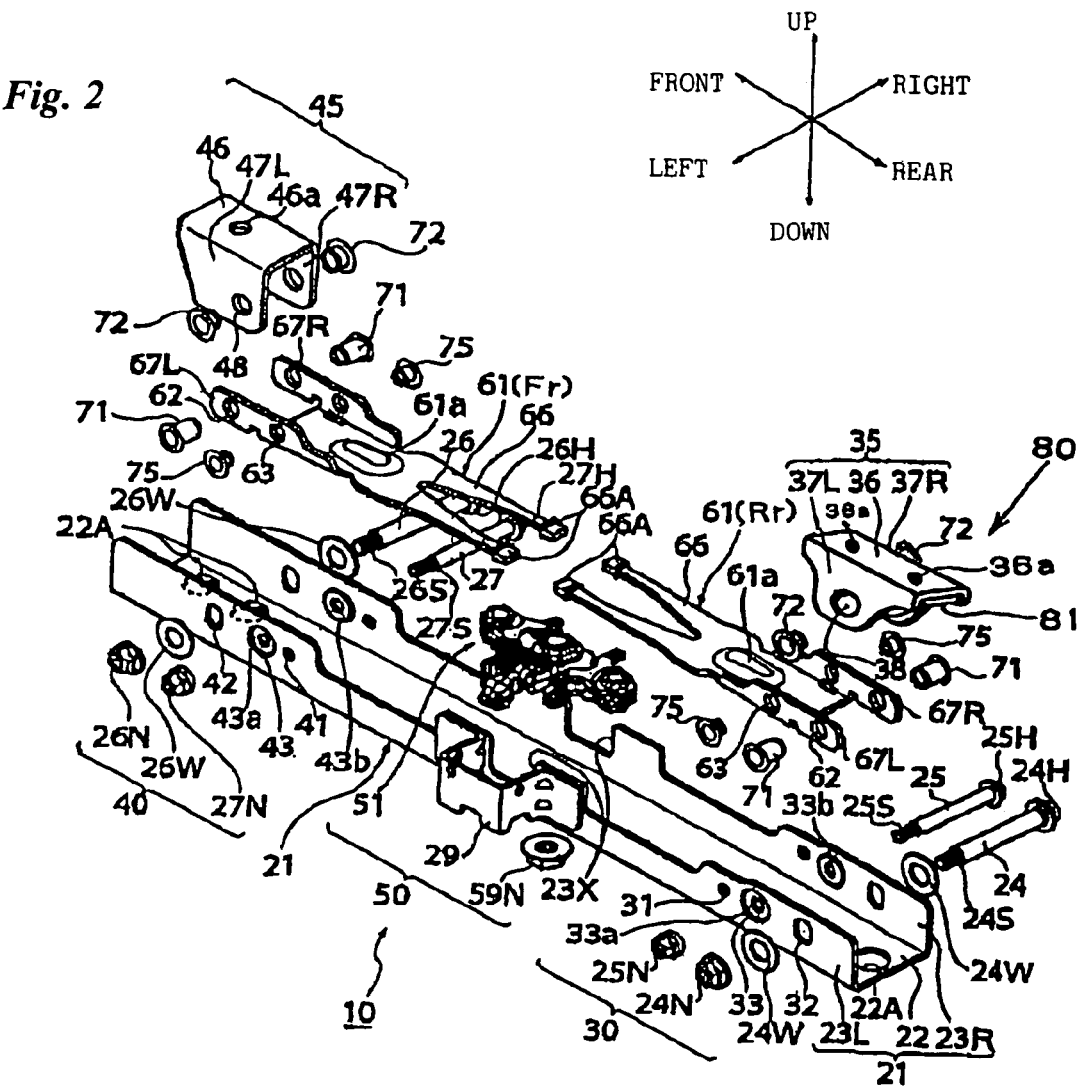
FIG. 2 is an exploded perspective view of an embodiment of the seat-load measuring apparatus according to the present invention.
Figure 4:
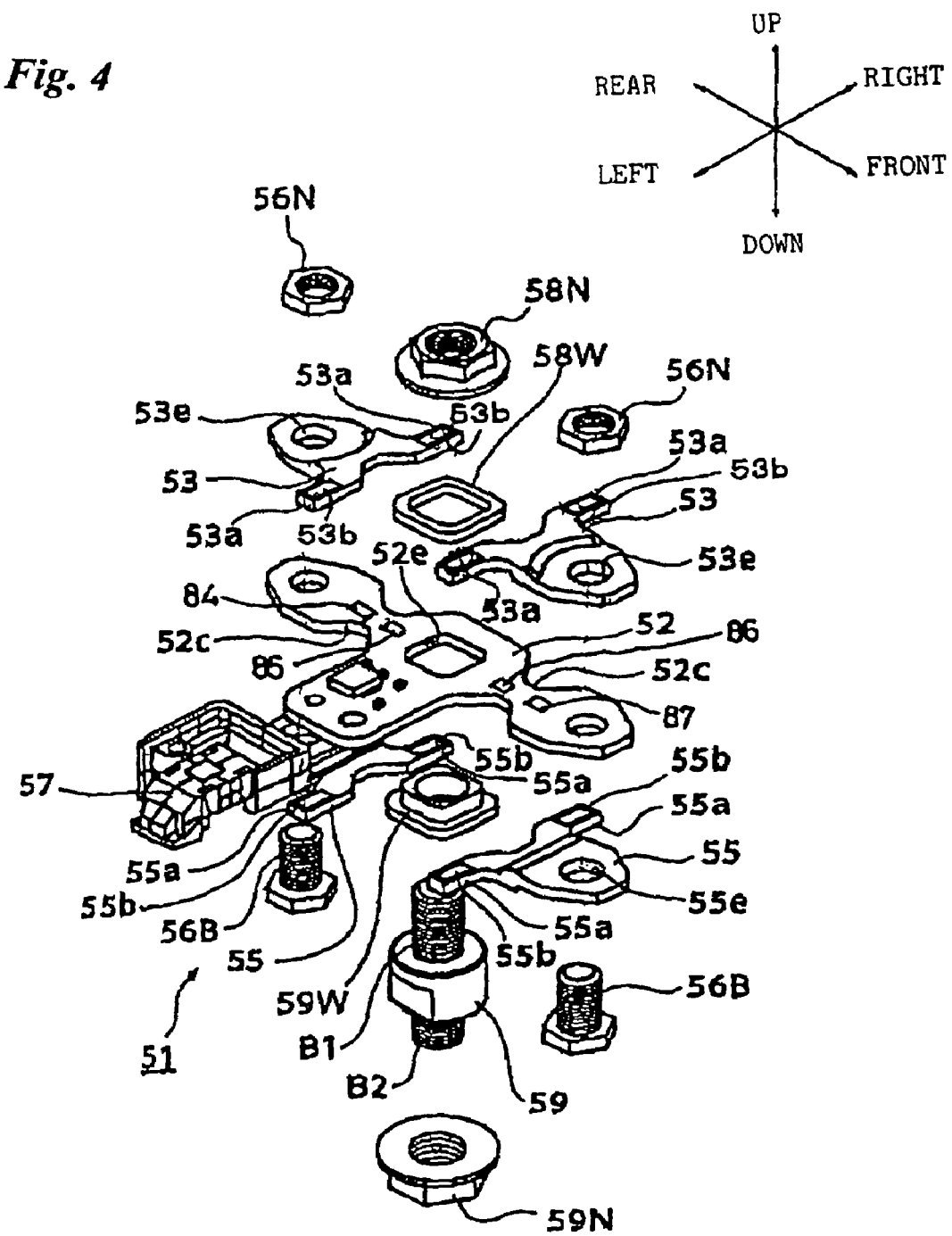
FIG. 4 is an exploded perspective view of a sensor section in the seat-load measuring apparatus of one embodiment.
Figure 5A:
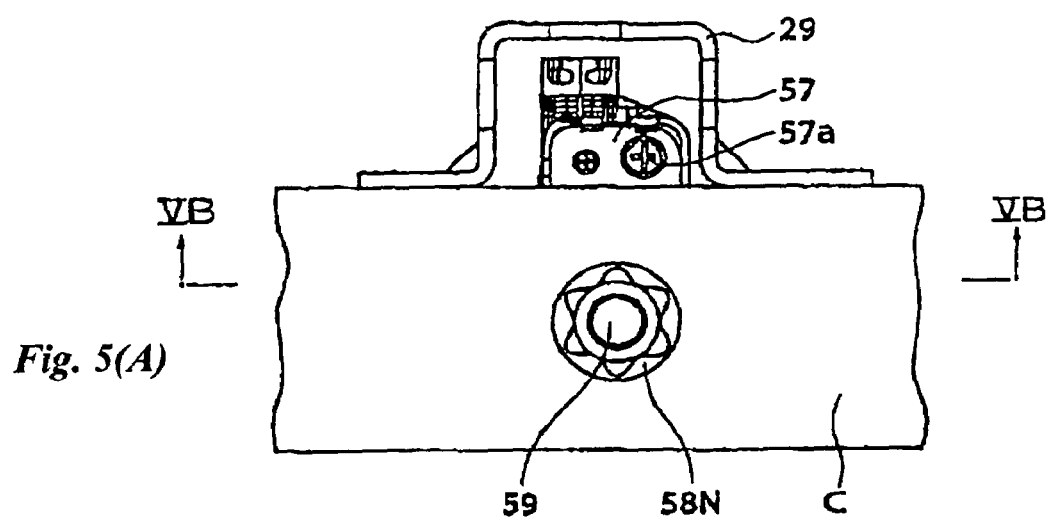
FIG. 5(A) is a plan view showing the sensor section and the surroundings in the seat-load measuring apparatus of an embodiment.

FIG. 1 is a side view of a vehicle seat to which an embodiment of a seat-load measuring apparatus according to the present invention is applied, FIG. 2 is an exploded perspective view of the embodiment of the seat-load measuring apparatus according to the present invention, FIG. 3(A) is a plan view of the seat-load measuring apparatus of this embodiment in an assembled state, FIG. 3(B) is a cross-sectional view, taken along line IIIB—IIIB in FIG. 3(A), FIG. 4 is an exploded perspective view of a sensor section in the seat-load measuring apparatus of this embodiment, and FIG. 5 is an enlarged partial view of the sensor section and its surroundings in the seat-load measuring apparatus of this embodiment. Throughout the description of the present invention, "front, rear, left, right, upper, and lower" sides refer to "front, rear, left, right, upper, and lower" sides of a vehicle.

As shown in FIG. 1, a seat pan 2 made of a steel plate is provided under a seat cushion 1a of a vehicle seat 1 on which a passenger sits so as to cover the entire lower surface of the seat cushion 1a. A pair of side frames 3 (only one of the side frames 3 is shown in FIG. 1) hang under the seat pan 2 with a predetermined space therebetween in the vehicle right-left direction. These side frames 3 extend in the front-rear direction of the vehicle.

Seat rails 8 (only one of the seat rails 8 is shown in FIG. 1) are respectively provided at the lower ends of the side frames 3. Each of the seat rails 8 includes an upper rail 11 fixed at the lower end of the side frame 3, and a lower rail 15 attached to the upper rail 11 so as to slide relative to the upper rail 11 in the vehicle front-rear direction, and guides the vehicle seat 1 to move in the vehicle front-rear direction.

Seat-load measuring apparatuses 10 (only one of the seat-load measuring apparatuses 10 is shown in FIG. 1) are provided under the lower rails 15 with a pair of front and rear rail brackets 45 and 35 extending in the vehicle right-left direction therebetween, and these seat-load measuring apparatuses 10 are fixed to a pair of seat brackets 9 (only one of the seat brackets 9 is shown in FIG. 1) that are fixed on a body floor 7 with a predetermined space therebetween in the vehicle right-left direction. Such fixing of the seat brackets 9 to the car body allows the vehicle seat 1 to be stably supported by the car body, and allows the load to the vehicle seat 1 to be more precisely detected by load sensors 51.

As shown in FIGS. 2 and 3, each seat-load measuring apparatus 10 includes a base frame (corresponding to the base of the present invention) 21 extending in the vehicle front-rear direction, and the base frame 21 is composed of a base bottom 22 and left and right side walls 23L and 23R and has an upward-pointing (open at the top) U-shape in transverse section. The base frame 21 also has mounting sections 40 and 30 to be mounted to the vehicle body or the seat rail 8 at the front and rear ends thereof, and has a sensor section 50 at the center thereof.

The mounting section 30 at the rear end of the base frame 21 has a hole 22A (shown in FIG. 2) bored at a given position on the base bottom 22, and slots 32, pivot holes 33, and small holes 31 bored through the left and right base side walls 23L and 23R so as to oppose each other.

Figure 13A:
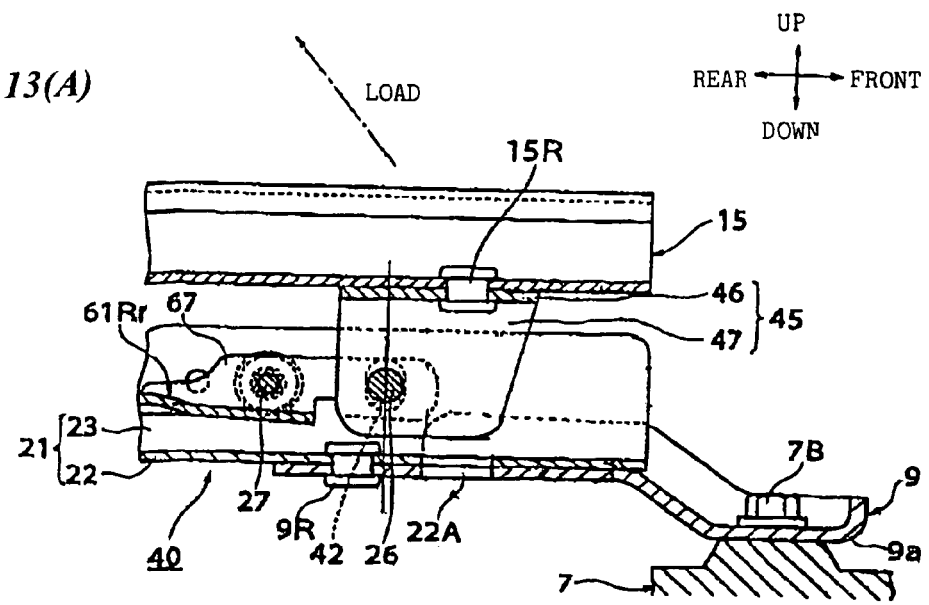
FIG. 13(A) is a sectional side view showing an example of a rear end portion of a base frame in the seat-load measuring apparatus shown in FIG. 2 in a normal state.

A rivet for fixing to the seat bracket 9 (shown in FIG. 13(A)), which will be described later, is passed through the hole 22A. The slots 32 vertically extend, and a stopper bolt (corresponding to the stopper pin in the present invention) 24 is passed through the slots 32, as shown in FIGS. 2, 3(A), 3(B), and 7(A). The stopper bolt 24 is a pivot support pin that pivotally supports and connects a rear rail bracket means 80 and a Z-arm 61Rr, and serves to transmit a seat load to the Z-arm 61Rr, as shown in FIG. 3(B). The stopper bolt 24 has a hexagonal head portion 24H at one end and a screw portion 24S at the other end, and is shaped like a cylinder having a smooth peripheral surface at the center.

After the stopper bolt 24 is passed through the slots 32, it is fixed by a stopper nut 24N with a stopper washer 24W therebetween.

Figure 7A:
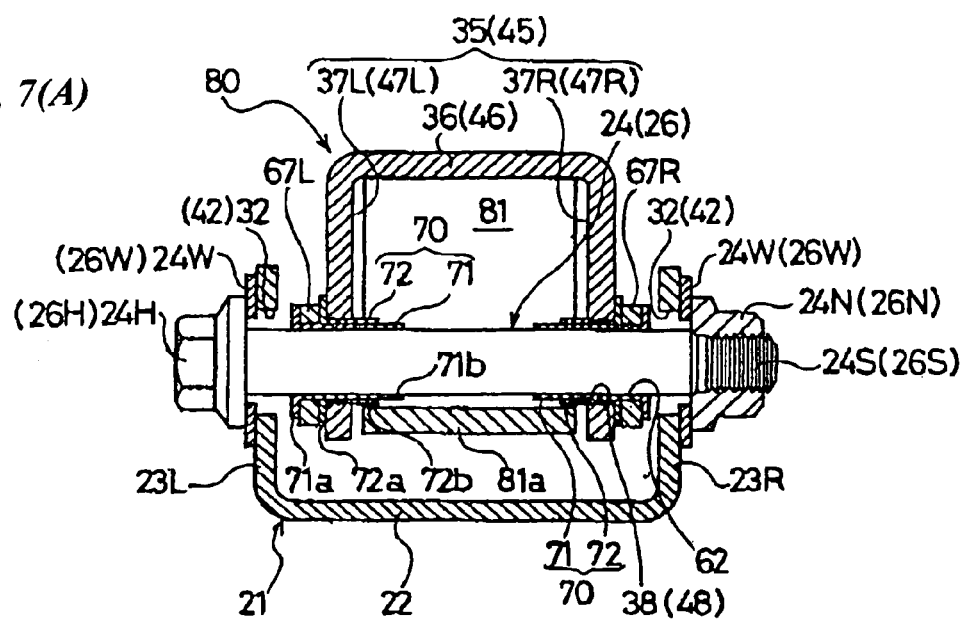
FIG. 7(A) is an enlarged sectional view of a bolt mounting section in the seat-load measuring apparatus of an embodiment, taken along the axis of a front stopper bolt.

In an assembled state shown in FIG. 7(A), gaps are formed between the stopper bolt 24 and the slots 32, and therefore, the stopper bolt 24 normally does not touch the inner rims of the slots 32. When the rear rail bracket 35 is raised by an excessive load applied to the vehicle seat 1, the stopper bolt 24 is moved up into contact with the upper rims of the slots 32. The excessive load is directly transmitted from the rear rail bracket 35 in the rear rail bracket means 80, which will be described later, to the base side walls 23L and 23R of the base frame 21, and does not act on a load sensor (a sensor plate 52 and so on; this will be described in detail later) 51. When the rear rail bracket 35 is pushed down by the force applied to a seat belt, the stopper bolt 24 is moved down into contact with the lower rims of the slots 32, and an action similar to the above is produced.

As shown in FIG. 2, the pivot holes 33 are bored adjacent to the slots 32 offset toward the center. The pivot holes 33 have annular counterbored portions 33a on the outer sides of the base side walls 23L and 23R, and annular projecting portions 33b on the inner sides of the base side walls 23L and 23R. A pivot bolt (pivot support pin) 25 is passed through the pivot holes 33, as shown in FIGS. 2, 3(A), 3(B), and 7(B). The pivot bolt 25 is a pivot support pin that supports the Z-arm 61Rr to pivot relative to the base frame 21. When a seat load is imposed on the Z-arm 61Rr, as shown in FIG. 3(B), the Z-arm 61Rr pivots on the pivot bolt 25. The pivot bolt 25 has a hexagonal head portion 25H at one end and a screw portion 25S at the other end, and is shaped like a cylinder having a smooth peripheral surface at the center. After the pivot bolt 25 is passed through the pivot holes 33, it is fixed by a pivot nut 25N.

Since the stopper bolt 24 and the pivot bolt 25 are fastened by the stopper nut 24N and the pivot nut 25N, respectively, they can be mounted easily and reliably.

The small holes 31 are provided adjacent to the pivot holes 33, and function as service holes through which the mounting condition is checked.

As shown in FIGS. 2, 3(A), and 3(B), the Z-arm 61Rr is disposed inside the base frame 21 in the mounting section 30 at the rear end. In plan view, the Z-arm 61Rr has a flat bifurcated portion 66, which bifurcates in the right and left directions, between the center and the rear end, and has arm side walls 67L and 67R standing upward on the left and right sides at the rear end. As shown in FIGS. 3(A), 3(B), 7(A), and 7(B), the Z-arm 61Rr is mounted along the inner sides of the base side walls 23L and 23R. Gaps are provided between the arm side wall 67L and the base side wall 23L and between the arm side wall 67R and the base side wall 23R, and flange portions of sleeves 70 (71, 72) and 75 which will be described later are disposed in the gaps.

As shown in FIG. 2, the left and right side walls 67L and 67R of the Z-arm 61Rr are also provided with holes 62 and 63 bored at the positions corresponding to the slots 32 and the pivot holes 33, respectively, of the base side walls 23L and 23R. As shown in FIGS. 2, 3(A), 3(B), 7(A), and 7(B), the stopper bolt 24 extends through the holes 62 (holes corresponding to the slots 32 of the base frame 21) provided near the rear end of the Z-arm 61Rr, and the pivot bolt 25 extends through the holes 63 (holes corresponding to the pivot holes 33 of the base frame 21) provided near the center of the Z-arm 61Rr.

The stopper bolt 24 principally serves to pivotally connect the rear rail bracket 35 and the Z-arm 61Rr, as shown in FIG. 3(B), and to transmit the seat load to the Z-arm 61Rr. In this case, since the gaps are formed between the stopper bolt 24 and the slots 32 of the base frame 21, as described above, the stopper bolt 24 and the base frame 21 do not interfere with each other in normal cases. The pivot bolt 25 principally serves to support the Z-arm 61Rr to pivot relative to the base frame 21. Therefore, the Z-arm 61Rr pivots on the pivot bolt 25.

An inner space of the bifurcated portion 66 of the Z-arm 61Rr is narrow near the center. As shown in FIGS. 2, 3(A), and 3(B), a raised portion 61a is provided at the center of the Z-arm 61Rr, and increases the strength of the Z-arm 61Rr. Both leading-end (rear-end) acting portions of the bifurcated portion 66 are covered with resin arm caps 66A. These arm caps 66A are sandwiched between wing portions 53a and 55a of upper and lower half arms 53 and 55 (shown in FIG. 5(B)) in the load sensor 51 (details thereof will be described later). These arm caps 66A minimize the noise produced by the contact between the leading-end acting portions of the Z-arm 61Rr and the wing portions 53a and 55a of the half arms 53 and 55. Consequently, the passenger sitting on the vehicle seat 1 will not feel uncomfortable.

When a load is imposed on the rear rail bracket 35, the Z-arm 61Rr slightly pivots, and the leading-end acting portions transmit the load to the sensor plate 52 through the half arms 53 and 55.

In the mounting section 30 at the rear end, the rear rail bracket means 80 is disposed inside the Z-arm 61Rr. As shown in FIG. 8, the rear rail bracket means 80 is constituted by the rear rail bracket 35 and a load support member 81.

Figures 9A, 9B, 9C:
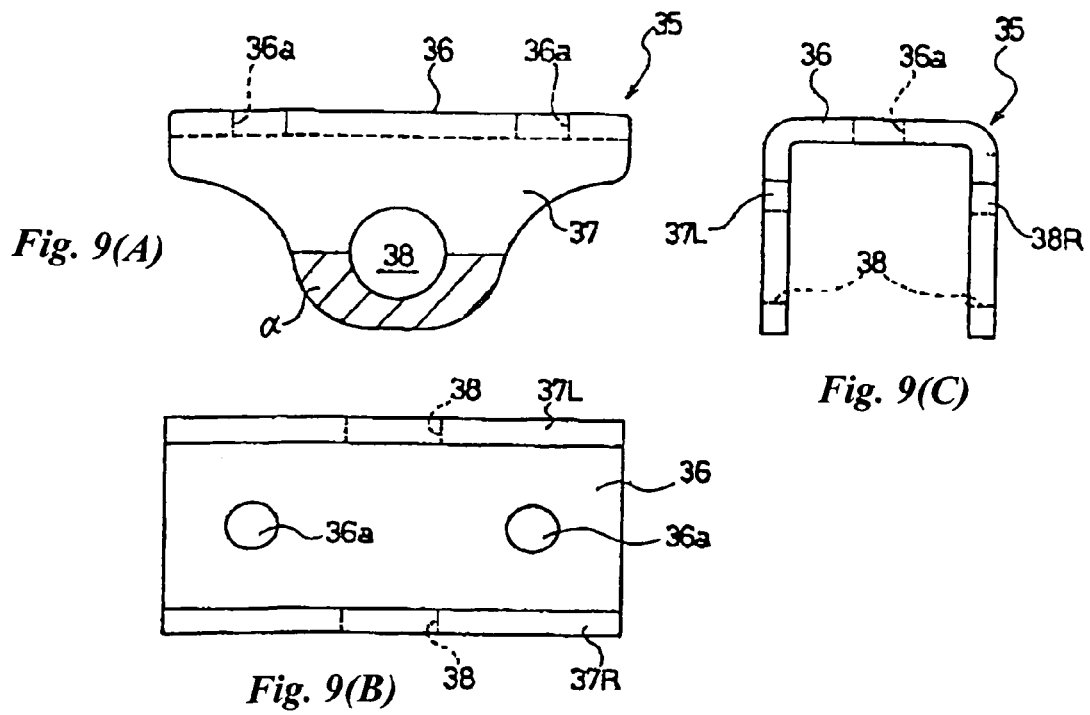
FIGS. 9(A), 9(B), and 9(C) are a front view, a bottom view, and a right side view, respectively, of a rear rail bracket in the rear rail bracket means in an embodiment.

As shown in detail in FIGS. 9(A) to 9(C), the rear rail bracket 35 has an upward-pointing angular-U shape in transverse section, and includes a flat upper base 36 and side walls 37L and 37R hanging from both the left and right ends of the upper base 36. The upper base 36 has two holes 36a, and the lower rail 15 of the seat rail 8 is attached to the upper surface of the upper base 36, as will be described later.

As is evident from FIG. 9(A), the left and right side walls 37L and 37R of the rear rail bracket 35 are substantially trapezoidal, and these side walls 37L and 37R have holes 38 opposing and aligned with each other. The holes 38 are provided at the positions corresponding to the slots 32 of the base side walls 23L and 23R and to the holes 62 of the Z-arm 61Rr.

Figures 10A, 10B, 10C:
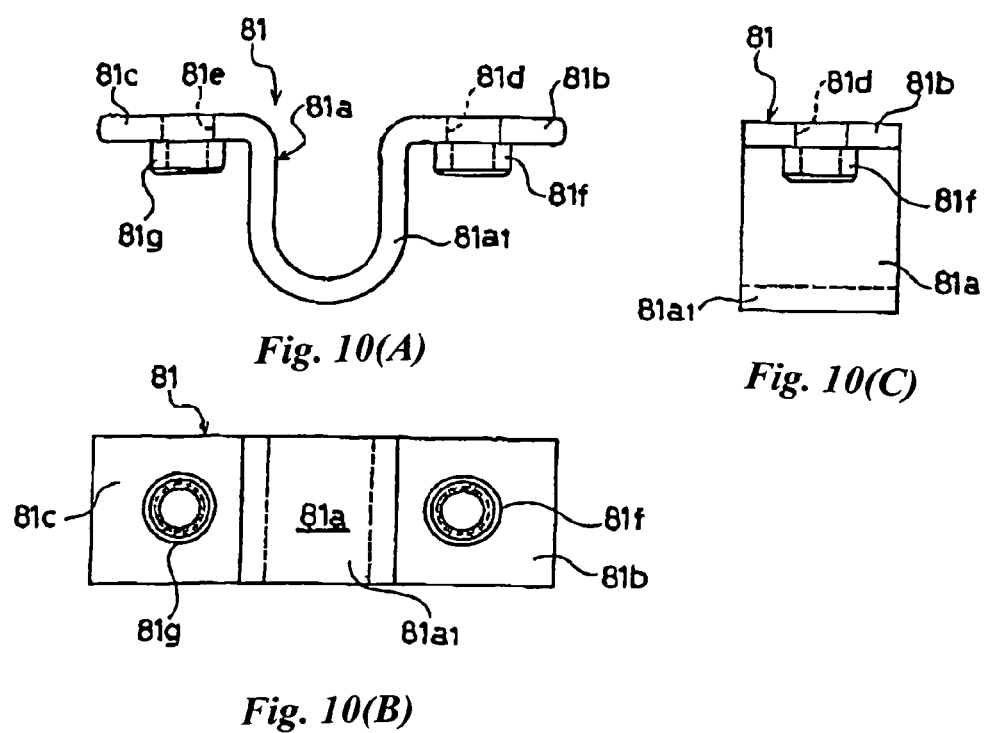
FIGS. 10(A), 10(B), and 10(C) are a front view, a bottom view, and a right side view, respectively, of a load support member in the rear rail bracket means in an embodiment.

As shown in FIGS. 10(A) to 10(C), the load support member 81 is made of a belt-shaped flat plate. A center portion 81a is U-shaped and has a semicircular arc portion $81a_1$, and flange portions 81b and 81c are provided at both ends of the U-shaped center portion 81a. The flange portions 81b and 81c respectively have holes 81d and 81e having the same size as the size of the holes 36a. Cylindrical bosses 81f and 81g are fixed, respectively, to the flange portions 81b and 81c, for example, by welding so that they are concentric with the holes 81d and 81e.

As shown in FIGS. 8(A) to 8(C), the upper surfaces of the flange portions 81b and 81c of the load support member 81 are brought into contact with the lower surface of the upper base 36 so that the semi-circular arc portion $81a_1$ of the center portion 81a of the load support member 81 is concentric with the holes 38 of the side wails 37L and 37R of the rear rail bracket 35 and so that the two holes 36a and the two holes 81d and 81e are concentric with each other. In this state, the rear rail bracket 35 and the load support member 81 are combined, for example, by projection welding.

Figure 11A:
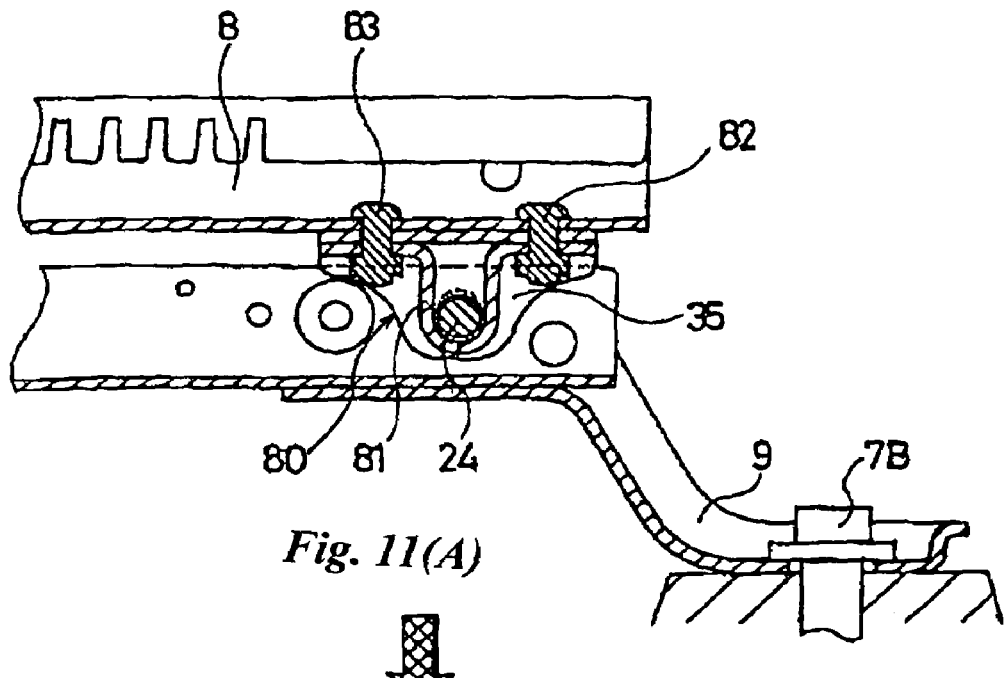
FIG. 11(A) is a view showing a structure for connecting a seat rail and a base with the rear rail bracket means therebetween in an embodiment in a state in which the load is normal.
Figure 11B:
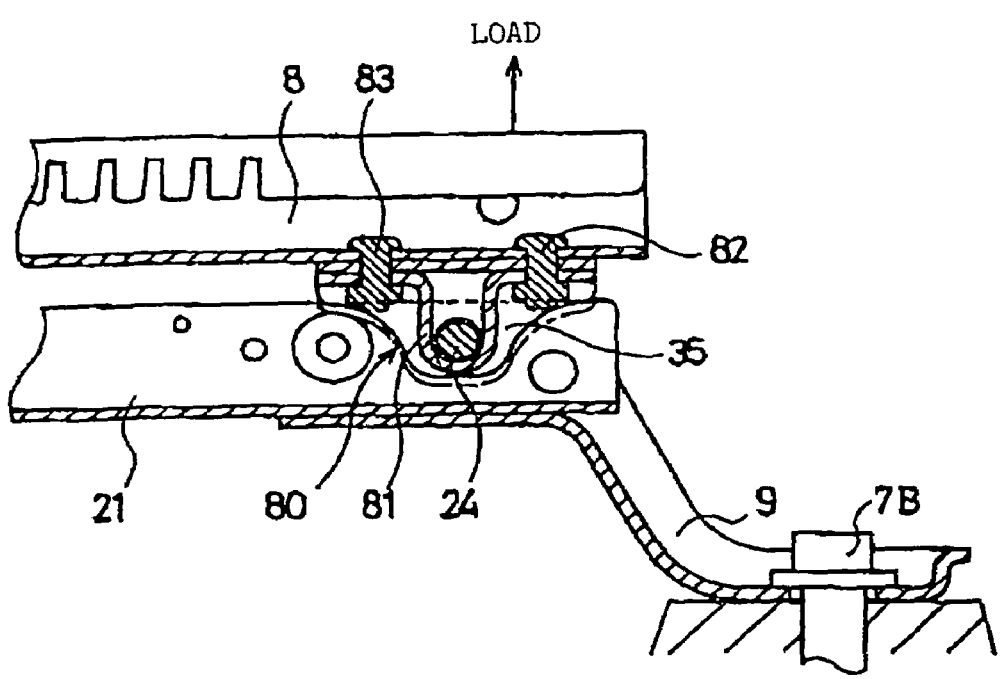
FIG. 11(B) is a view showing the structure in a state in which a heavy load is imposed on the seat rail.

As shown in FIGS. 7(A), 11(A), and 11(B), when the rear rail bracket means 80 is assembled, the stopper bolt 24 is passed through the holes 38 and the semicircular arc portion $81a_1$ of the center portion 81a of the load support member 81. In this case, double sleeves 70 are interposed between the outer peripheral surface of the stopper bolt 24, and the inner peripheral surfaces of the holes 38 and the inner peripheral surface of the semicircular arc portion $81a_1$ of the load support member 81. In a state in which the stopper bolt 24 is placed, a given small gap is formed between the outer peripheral surface of the stopper bolt 24 and the inner peripheral surface of the semicircular arc portion $81a_1$.

Fasteners (e.g., rivets or bolts) 82 and 83 for fastening the upper base 36 and the seat rail 8 are passed, respectively, through the holes 36a, the holes 81d and 81e, and inner holes of the bosses 81f and 81g, as shown in FIGS. 11(A) and 11(B). Also, seat bracket 9 may be fixed to the body floor 7 via a bolt 7B. As shown in FIG. 13(A), mounting section 40 may be connected to the seat bracket via a rivet 9R.

When an upward load is imposed on the seat rail 8, since the load is relatively light in normal cases, it is sufficiently supported by the rear rail bracket 35, but is not supported by the load support member 81. In contrast, when a relatively heavy upward load is imposed on the seat rail 8, for example, in a vehicle collision, the semicircular arc portion $81a_1$ of the load support member 81 touches the stopper bolt 24 directly or through the double sleeves 70 which will be described later, and the heavy load is sufficiently supported by the load support member 81.

Since a heavy load produced, for example, in a vehicle collision can be supported by the load support member 81 in this way, the rear rail bracket means 80 ensures a sufficient strength to withstand such a heavy load. Consequently, it is unnecessary to increase the strength of portions α of the rear rail bracket 35, diagonally shaded in FIG. 9(A), where the holes 38 are provided (areas below the centers of the holes 38). As a result, it is unnecessary to increase the dimensions of the portions a at the holes 38 (for example, the thicknesses of the side walls 37L and 37R of the rear rail bracket 35, and the distances from the holes 38 to the outer peripheral edges of the side walls 37L and 37R).

Since the rear rail bracket 35 can be thereby made compact, layout restrictions can be lightened, and the mounting flexibility can be increased.

Moreover, since the heavy load can be supported by the contact between the semicircular arc portion $81a_1$ of the load support member 81 made of a belt-shaped plate and the stopper bolt 24, as described above, it can be reliably supported with a simple structure.

The semicircular arc portion $81a_1$ is not always shaped like a semicircular arc, and may be shaped like an arc having a given angle.

Figure 12:
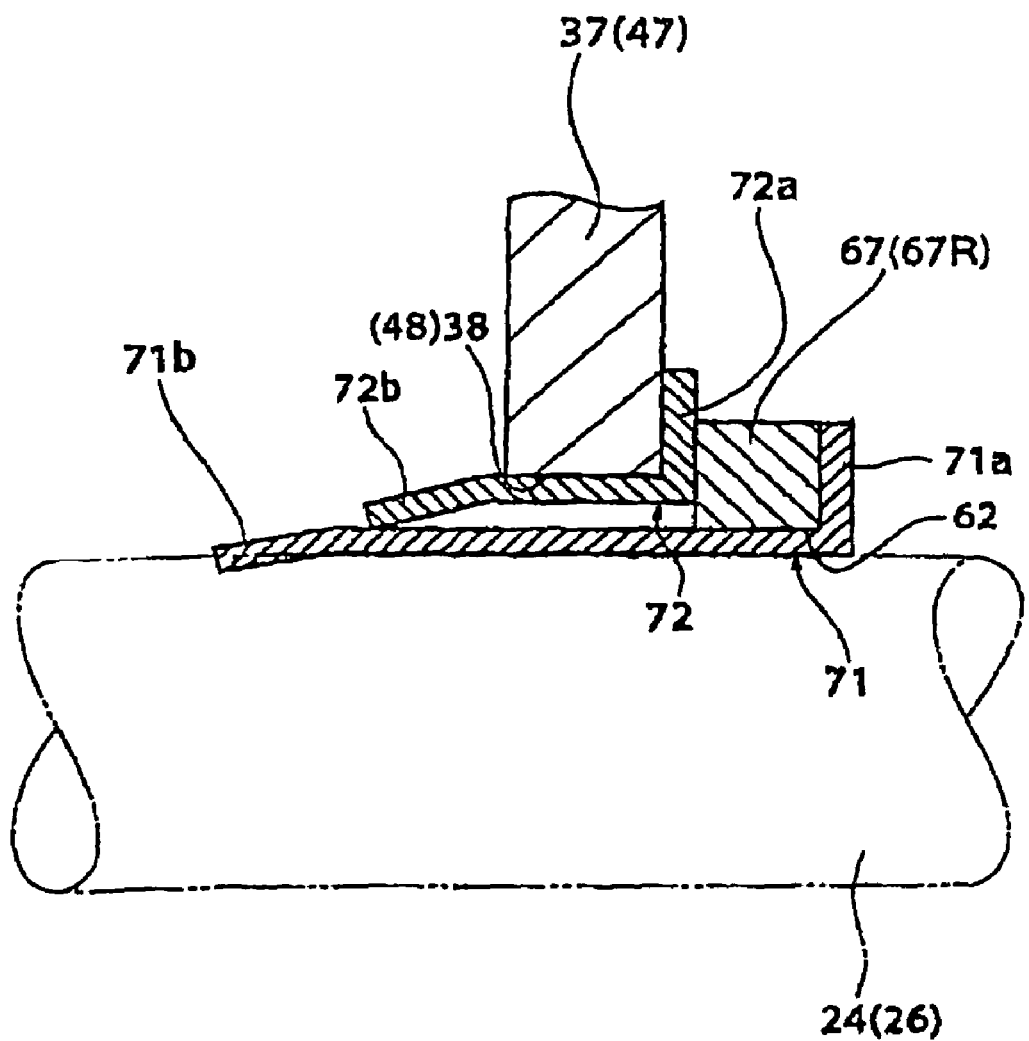
FIG. 12 is an enlarged sectional view showing the adjacency of double sleeves in the seat-load measuring apparatus in an embodiment.

As shown in FIGS. 7(A) and 12, the double sleeves 70 are fitted on the cylindrical portion of the stopper bolt 24, and each of the double sleeves 70 includes a relatively long inner sleeve 71 and a relatively short outer sleeve 72 fitted on the inner sleeve 71. The sleeves 71 and 72 respectively have flange portions 71a and 72a at one end, and tapered portions 71b and 72b at the other end (shown in FIG. 12). The inner surfaces of the sleeves 71 and 72 and the end faces of the flange portions 71a and 72a are coated with Teflon (registered trademark). In FIG. 12, the inclinations of the tapered portions 71b and 72b are exaggerated.

The inner sleeves 71 of the double sleeves 70 are fitted between the shaft portion of the stopper bolt 24, and the holes 62 of the arm side walls 67L and 67R and the holes 38 of the rear rail bracket 35. The outer sleeves 72 are press-fitted between the outer peripheral surfaces of the inner sleeves 71 and the holes 38 of the rear rail bracket 35. The flange portions 72a of the outer sleeves 72 are interposed between the arm side walls 67L and 67R and the side walls 37L and 37R, respectively, of the rear rail bracket 35. The flange portions 71a of the inner sleeves 71 are disposed along the outer sides of the arm side walls 67L and 67R.

Next, the relationship between the double sleeves 70 and the peripheral members, and the operation thereof will be described with reference to FIG. 12.

The outer peripheral portions of the inner sleeves 71 are press-fitted in the holes 62 of the arm side walls 67L and 67R, so that the inner sleeves 71 will not rattle inside the holes 62. Between the inner sleeves 71 and the stopper bolt 24 fitted in the inner holes of the inner sleeves 71, the tapered portions 71b of the inner sleeves 71 elastically touch and hold the outer peripheral surface of the stopper bolt 24. Therefore, the stopper bolt 24 will not rattle inside the inner holes of the inner sleeves 71, although there are gaps between the inner sleeves 71 and the stopper bolt 24 in the portions other than the tapered portions 71b.

Between the outer sleeves 72 and the inner sleeves 71 fitted in the inner holes of the outer sleeves 72, the tapered portions 72b of the outer sleeves 72 elastically touch and hold the outer peripheral surfaces of the inner sleeves 71. Therefore, the inner sleeves 71 will not rattle inside the inner holes of the outer sleeves 72, although there are gaps between the outer sleeves 72 and the inner sleeves 71 in the portions other than the tapered portions 72b.

Since gaps that allow the members to rattle are not formed between the side walls 37L, 37R of the rear rail bracket 35 and the stopper bolt 24 in this way, it is possible to prevent noise from being produced by the rattling of the members when the load applied to the vehicle seat changes. The double sleeves 70 are not always necessary, and may be omitted when rattling rarely occurs.

A description will now be given of the configuration around the pivot bolt 25 serving as the pivot for the Z-arm 61Rr and the rear rail bracket 35.

Figure 7B:
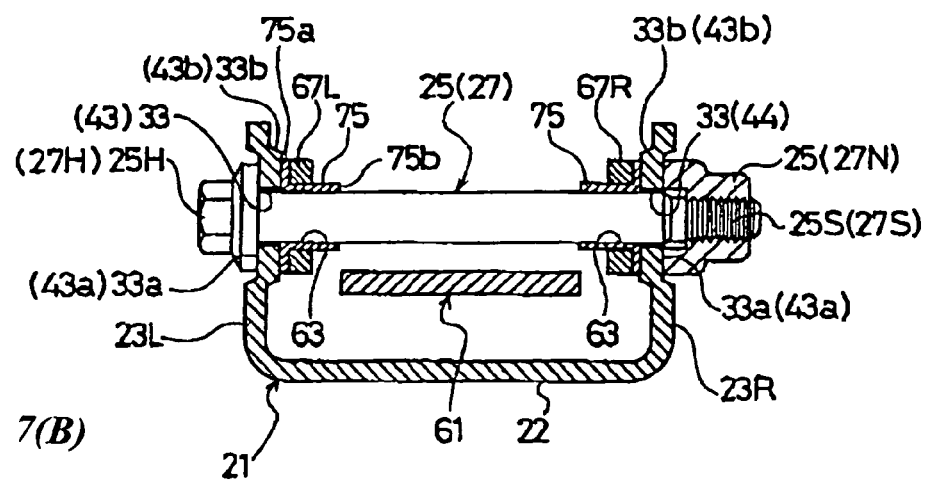
FIG. 7(B) is an enlarged sectional view of the bolt mounting section, taken along the axis of a pivot bolt.

As shown in FIG. 7(B), sleeves 75 are fitted around the cylindrical portion of the pivot bolt 25. The sleeves 75 have flange portions 75a at one end, and tapered portions 75b at the other end. The inner surfaces of the sleeves 75 and the end faces of the flange portions 75a are coated with Teflon (registered trademark).

The outer peripheral portions of the sleeves 75 are press-fitted in the holes 63 of the arm side walls 67L and 67R, so that the sleeves 75 will not rattle inside the holes 63. Between the sleeves 75 and the pivot bolt 25 fitted in the inner holes thereof, the tapered portions 75b of the sleeves 75 elastically touch and hold the outer peripheral surface of the pivot bolt 25. Therefore, the pivot bolt 25 will not rattle in the inner holes of the sleeves 75, although there are gaps between the sleeves 75 and the pivot bolt 25 in the portions other than the tapered portions 75b. Consequently, it is possible to prevent noise from being produced by the rattling of the pivot bolt 25 and the Z-arm 61Rr when the load imposed on the vehicle seat 1 changes, in a manner similar to that in the above-described double sleeves 70.

A Z-arm 61Fr disposed inside the front end of the base frame 21 has the same structure as that of the above-described Z-arm 61Rr at the rear end of the base frame 21, and includes a bifurcated portion 66, arm side plates 67L and 67R, and arm caps 66A at leading-end acting portions. As shown in FIGS. 2, 3(A), and 3(B), the Z-arm 61Rr at the rear end of the base frame 21 and the Z-arm 61Fr at the front end of the base frame 21 are disposed symmetrically with respect to the base center.

Figure 6A:
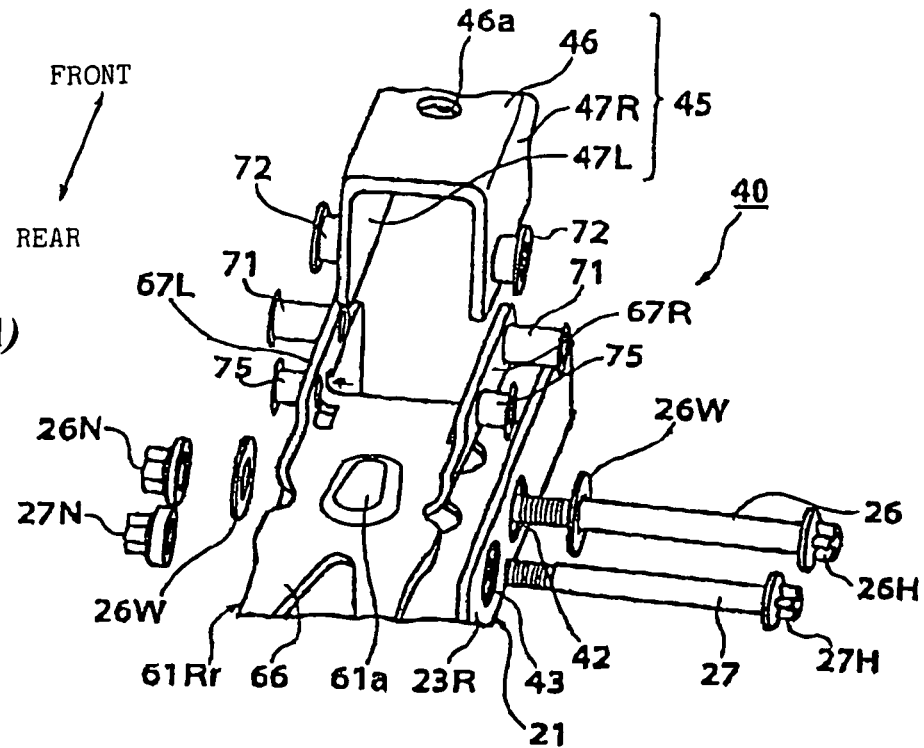
FIGS. 6(A) and 6(B) are an exploded view and an assembly view, respectively, of a rear end section of the seat-load measuring apparatus of an embodiment.
Figure 6B:
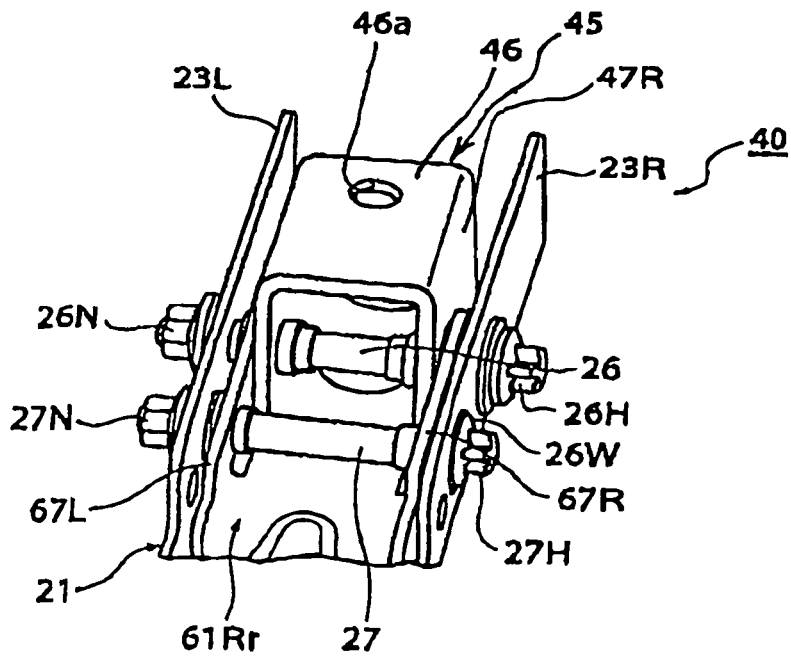
Figure 13B:
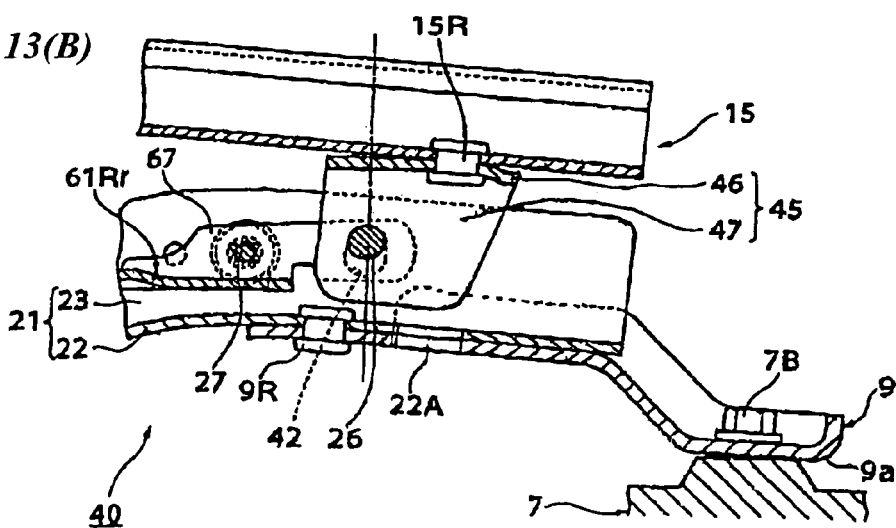
FIG. 13(B) is a sectional side view showing a state after a force acts in a direction such as to lift a seat.
Figure 14A:
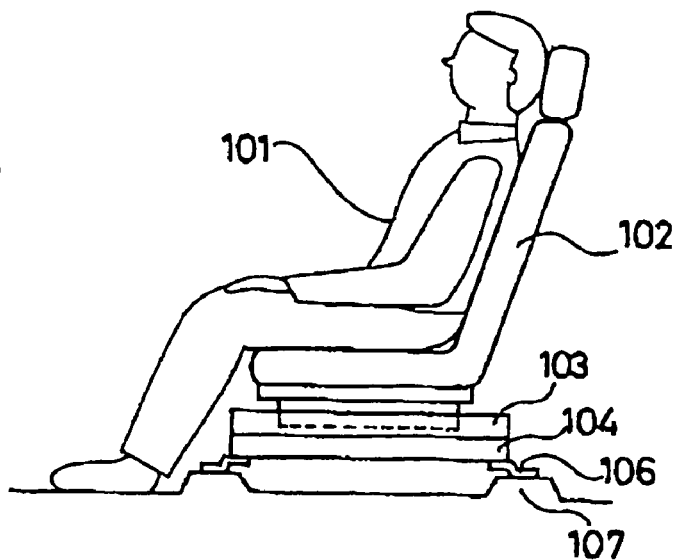
FIG. 14(A) is a view showing a conventional seat-load measuring apparatus disclosed in Japanese Unexamined Patent Application Publication No. 2000-258234 in a state in which a person is sitting on a vehicle seat.
Figure 14B:
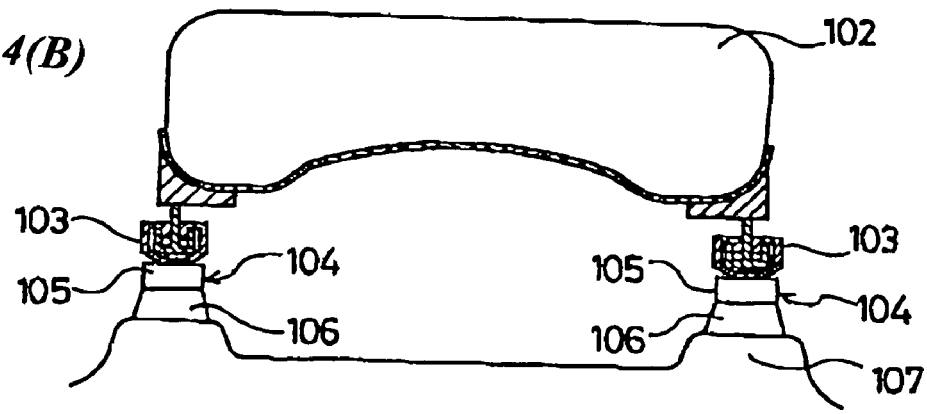
FIG. 14(B) is a sectional view showing a mounting state of the seat-load measuring apparatus.
Figure 14C:
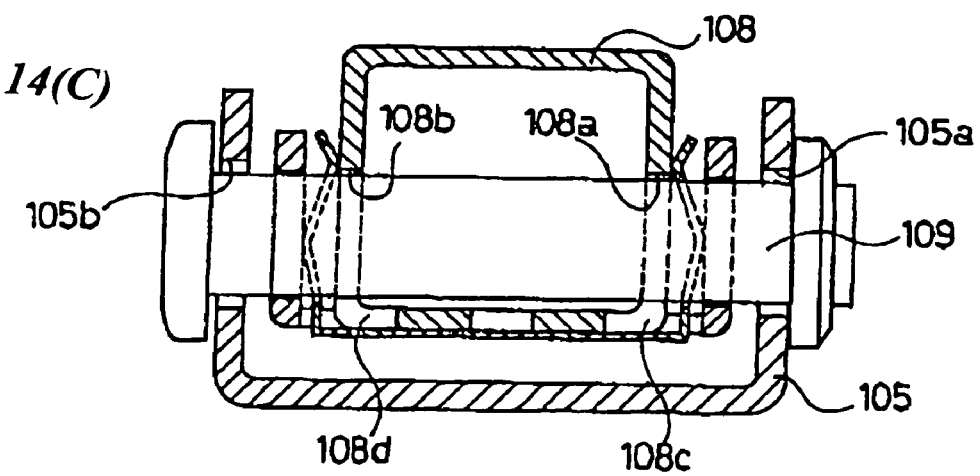
FIG. 14(C) is a detailed sectional view showing the mounting of the seat-load measuring apparatus.

A front rail bracket 45 is disposed inside the Z-arm 61Fr. As shown in FIGS. 2, 6(A), and 6(B), the front rail bracket 45 has an angular-U shape in transverse section, and includes a flat upper base 46 and side walls 47L and 47R hanging from both the left and right ends of the upper base 46. The lower rail 15 of the seat rail 8 is attached to the upper surface of the upper base 46. In this case, the upper base 46 has a hole 46a, and a rivet 15R (shown in FIG. 13) for fastening the upper base 46 and the lower rail 15 is provided through the hole 46a.

The left and right side walls 47L and 47R of the front rail bracket 45 are substantially trapezoidal, and these side walls 47L and 47R have holes 48 bored at the positions corresponding to slots 42 of the base side walls 23L and 23R. As shown in FIGS. 2, 3(A), 3(B), and 7(A), a stopper bolt 26 extends through the holes 48 (holes corresponding to the slots 42 and holes 62 of the Z-arm 61Fr). As shown in FIGS. 7(A) and 12, double sleeves 70 are fitted between the stopper bolt 26, and the holes 48 of the front rail bracket 45 and the holes 62 of the Z-arm 61Fr, in a manner similar to that in the above. In this case, the stopper bolt 26 is loosely fitted in the slots 42 of the base frame 21. Of course, mounting section 40 includes elements corresponding to elements of mounting section 30. For example, as shown in FIG. 2, mounting section 40 includes a stopper bolt 26 (corresponding to stopper bolt 24) having hexagonal head portion 26H and screw portion 26S, passing through slots 42 and secured by stopper nut 26N and stopper washer 26W. Further, mounting section 40 includes a pivot bolt 27 (corresponding to pivot bolt 25) having hexagonal head portion 27H and screw portion 27S, passing through pivot holes 43, the pivot holes each having a counterbored portion 43a and an annular projecting portion 43b, and secured by pivot nut 27N and pivot washer 27W. Further, mounting section 40 includes small holes 41, corresponding to small holes 31.

The sensor section 50 of the base frame 21 will now be described.

As shown in FIG. 2, cutouts 23X are respectively provided in the left and right base side walls 23L and 23R. A protector 29 protruding leftward is fixed to the outer surface of the left base side wall 23L. A load sensor 51 is provided inside the cutouts 23X of the base frame 21 and the protector 29, and is protected by the protector 29.

Figure 5B:
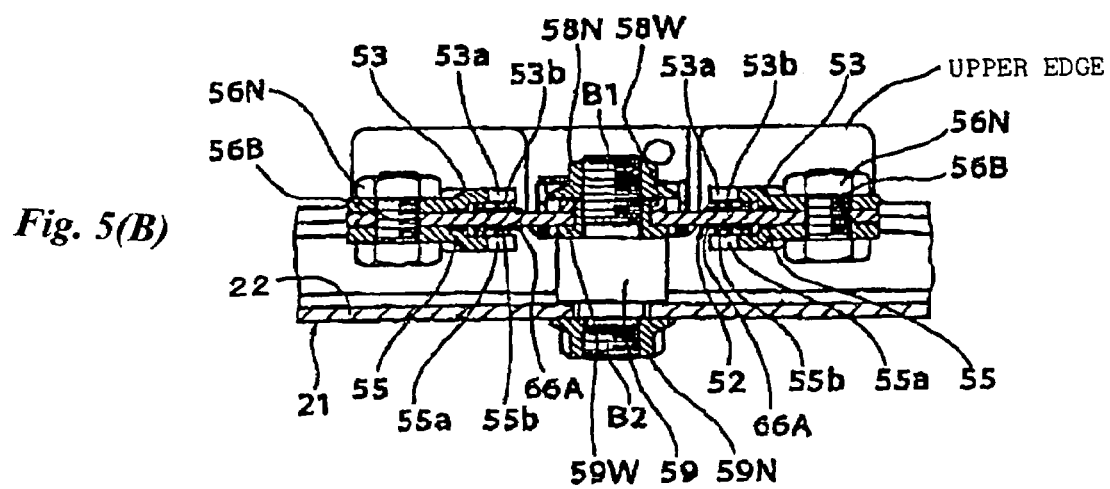
FIG. 5(B) is a cross-sectional view, taken along line VB—VB in FIG. 5(A).

As shown in FIG. 5(B), in a state in which a sensor plate 52, a connector case 57f, and the protector 29 are assembled onto the base frame 21, the upper edge of the protector 29 is higher than the upper surface of the sensor plate 52, the upper surface of the connector case 57f, and the upper surface of a sensor-side connector 57. The lower edge of the protector 29 is lower than the lower surface of the sensor plate 52, the lower surface of the connector case 57f, and the lower surface of the sensor-side connector 57. Accordingly, when the seat-load measuring apparatus 10 and the base frame 21 with the protector 29 are mounted to the vehicle body or the base frame 21 is transported, even if the base frame 21 falls off, the precision components, such as the sensor plate 52 and the connector 57 of the seat-load measuring apparatus 10, can be reliably protected by the protector 29.

In order to more reliably protect the precision components, it is preferable to cover the upper side of the protector 29 with a cover (not shown) because the upper side of the protector 29 is open. While the lower side of the protector 29 is also open, even if foreign matters enter the inside of the protector 29, they are easily discharged therefrom. Therefore, there is no need to cover the lower side of the protector 29 with a cover.

As shown in FIG. 4, the sensor plate 52 serving as a main component of the load sensor 51 and made of a spring material is shaped like a rectangular plate having two neck portions 52c as a whole. The sensor-side connector 57 is fixed to the left center end of the sensor plate 52 by a screw 57a (shown in FIG. 5(A)). An end of a cable coupled to an electronic control unit (ECU), which is not shown, is connected to the sensor-side connector 57.

An insulating layer for electrical insulation, a wiring layer, and a resistor layer are deposited on the sensor plate 52. In this deposition method, the sensor plate 52 is provided with four strain resistors 84, 85, 86, and 87 serving as strain sensors that constitute the load sensor 51, as shown in FIG. 4. Although not shown, these four strain resistors 84, 85, 86, and 87 are connected to form a well-known type of bridge circuit, and the bridge circuit is connected to the connector 57.

When a seat load is imposed on the sensor plate 52, a strain corresponding to the seat load is produced in the sensor plate 52, and changes the resistances of the four strain resistors 84, 85, 86, and 87. The changes in the strain resistances are detected, and corresponding detection signals are transmitted to the ECU. The ECU finds the strain of the sensor plate 52, that is, the seat load by calculating the resistance changes based on the detection signals transmitted from the strain resistors 84, 85, 86, 87. Instead of detecting the strain of the sensor plate 52 based on the strain resistors, for example, the seat load may be found by detecting the deflection of the sensor plate 52 with other detection elements such as a capacitor element and a Hall element.

A structure for mounting the sensor plate 52 to the base bottom 22 will now be described.

As shown in FIG. 5(B), a cylindrical center post 59 having bolts B1 and B2 at the upper and lower ends fixedly stands on the longitudinal center of the base bottom 22. The lower bolt B2 of the center post 59 extends through the base bottom 22, and is screwed in a center nut 59N. The upper bolt B1 of the center post 59 extends through a center hole 52e (shown in FIG. 4) of the sensor plate 52 through a center washer 59W, and is fixed by a center nut 58N through a washer 58W. The center of the sensor plate 52 is firmly fixed to the base bottom 22 of the base frame 21 with the center post 59 therebetween.

The description of the structure of the load sensor 51 will be continued.

Half arms 53 and 55 are assembled to the front and rear ends of the sensor plate 52. As shown in FIGS. 4 and 5(B) these half arms 53 and 55 are four front, rear, upper, and lower components, and are mounted to vertically sandwich the front and rear ends of the sensor plate 52. Since the half arms 53 and 55 have the same shape, a description will be given only of the lower half arms 55.

As shown in FIG. 4, each half arm 55 is shaped like a rectangular plate, and has a mounting hole 55e bored at the base center thereof. A wing portion 55a protruding to both sides in the lateral direction is provided at an end of the half arm 55 near the center. A bank-shaped fulcrum 55b extending in the right-left direction is provided on the back side of the wing portion 55a. The leading end of the fulcrum 55b is shaped like a slightly pointed edge.

A description will now be given of a structure for assembling the upper and lower half arms 53 and 55, the sensor plate 52, and the acting portions (arm caps 66A) of the Z-arms 61Fr, 61Rr.

As shown in FIG. 5(B), the base portions of the upper and lower half arms 53 and 55 are fixed in tight contact with the surfaces of the sensor plate 52 by bolts 56B and nuts 56N, the bolts 56B passing through mounting holes 53e, 55e of the half arms 53, 55, respectively. The wing portions 53a and 55a of the upper and lower half arms 53 and 55 face each other with the fulcrums 53b and 55b opposing each other. The arm caps 66A of the Z-arm acting portions are held between the fulcrums 53b and 55b. The fulcrums 53b and 55b are positioned corresponding to the neck portions 52c of the sensor plate 52.

The operation of the upper and lower half arms 53 and 55, the sensor plate 52, and the Z-arms 61Fr, 61Rr when a load is imposed on the seat-load measuring apparatus 10 is described in detail in, for example, Japanese Unexamined Patent Application Publication No. 2000-258223, and can be understood with reference to this publication. Therefore, the description is omitted herein. The load imposed on the seat-load measuring apparatus 10 can be calculated by the ECU on the basis of the measured strain of the sensor plate 52, as described above.

As is evident from the above description, in the seat-load measuring apparatus 10, even when a relatively heavy load is imposed on the seat rail 8, for example, in a vehicle collision, it can be sufficiently supported by the load support member.

Since the heavy load can be supported by the seat support member in this way, the rail bracket means 80 can have a sufficient strength such as to withstand such a heavy load. Consequently, it is unnecessary to increase the strength of the rail bracket 35. As a result, it is unnecessary to increase the dimensions of the rail bracket 35.

Therefore, since the rail bracket 35 can be made more compact, layout restrictions can be lightened, and the mounting flexibility can be increased.

In particular, according to the present invention, because the above-described heavy load is supported by the contact of the arc portion of the load-support member 81 made of a belt-shaped plate with the stopper pin, it can be reliably supported with a simple structure.

According to the present invention, since the vehicle seat 1 can be stably supported on the vehicle body by fixing the seat bracket to the vehicle body, the load on the vehicle seat 1 can be more precisely detected by the load sensor 51.

The priority application, Japanese Patent Application No. 2003-113970 filed on Apr. 18, 2003, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat-load measuring apparatus comprising:
a base having an open top and configured to be fixed to a seat bracket configured to support a load imposed on a vehicle seat;
an arm supported by the base and configured to receive the load imposed on the vehicle seat;
a load sensor supported by the arm to detect the load imposed on the vehicle seat;
a U-shaped rail bracket having a pair of side walls and a base configured to support a seat rail that movably guides the vehicle seat in a vehicle front-rear direction, and to connect the base to the seat rail, wherein each side wall includes a hole;
a load support member connected to the rail bracket and configured to support a load imposed on the seat rail, the load being heavier than a predetermined load, wherein the load support member is a belt-shaped flat member with a U-shaped center portion fixed to the rail bracket by a stopper pin that extends through both the center portion and the holes in the sidewalls,
wherein the base is connected under the seat rail with the rail bracket located therebetween.

2. The apparatus of claim 1, wherein the load support member comprises a U-shaped, belt-shaped plate having an arc portion.

3. The apparatus of claim 2, wherein the arm and the rail bracket are connected by the stopper pin, and wherein, when the load heavier than the predetermined load is imposed on the seat rail, the arc portion of the load support member is brought into contact with the stopper pin to support the load.

4. The apparatus of claim 3, wherein the load heavier than the predetermined load is an upward load, and wherein, when the load heavier than the predetermined load is imposed on the seat rail, the arc portion of the load support member moves upward relative to the stopper pin into contact with the stopper pin to support the load.

5. The apparatus of claim 1, wherein the seat bracket is fixed to a vehicle body.

6. An apparatus for measuring a load on a vehicle seat comprising:
a base having an open top and positioned under a seat rail that guides the seat in a vehicle front-rear direction;
an arm supported by the base and configured to receive the load imposed on the seat;
a load sensor configured to detect the load on the seat, wherein the sensor is supported by the arm;
a U-shaped rail bracket located between the base and the seat rail, the bracket having a pair of side walls and a base configured to support the seat rail, wherein each sidewall includes a hole;
a load support member connected to the bracket and configured to support a load imposed on the seat rail that exceeds a predetermined load, wherein the load support member is a belt-shaped flat member with a U-shaped center portion fixed to the rail bracket by a stopper pin that extends through both the center portion and the holes in the sidewalls.

* * * * *